(12) United States Patent
Sharma

(10) Patent No.: US 11,360,855 B2
(45) Date of Patent: *Jun. 14, 2022

(54) SYSTEM AND METHOD FOR ANALYZING APPLICATION MAXIMUM PARALLEL CLONE SESSIONS FOR STORAGE DEVICES

(71) Applicant: EMC IP Holding Company LLC, Hopkinton, MA (US)

(72) Inventor: Anupam Sharma, Karanatka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,614

(22) Filed: Nov. 15, 2019

(65) Prior Publication Data
US 2020/0081795 A1    Mar. 12, 2020

Related U.S. Application Data

(63) Continuation of application No. 15/719,269, filed on Sep. 28, 2017, now Pat. No. 10,565,061.

(51) Int. Cl.
  *G06F 11/14*  (2006.01)
  *G06F 3/06*   (2006.01)
(52) U.S. Cl.
  CPC .......... *G06F 11/1451* (2013.01); *G06F 3/065* (2013.01); *G06F 3/067* (2013.01); *G06F 3/0619* (2013.01); *G06F 2201/84* (2013.01)
(58) Field of Classification Search
  CPC ............. G06F 11/1451; G06F 11/1448; G06F 3/0619; G06F 3/065; G06F 3/067; G06F 2201/84
See application file for complete search history.

(56) References Cited

U.S. PATENT DOCUMENTS 10,185,500 B1 *  1/2019  Chopra ............... G06F 3/0613
2007/0180309 A1  8/2007  Zohar et al.
2010/0142413 A1  6/2010  Eriksson et al.
(Continued)

OTHER PUBLICATIONS

EMC Data Domain Operating System (2017): p. 298-299 (Year: 2017).*

(Continued)

*Primary Examiner* — Kalpit Parikh
(74) *Attorney, Agent, or Firm* — Workman Nydegger

(57) ABSTRACT

One example method includes identifying one or more source storages and a respective available stream count for each source storage, identifying one or more target storages and a respective available stream count for each target storage, negotiating a maximum stream count for a combination of storages that includes the source storages and the target storages, in which the negotiation of the maximum stream count is based on: (i) the respective available stream counts for each source storage; and (ii) the respective available stream counts for each target storage, and the negotiation of the maximum stream count comprises comparing each source storage available stream count to a respective available stream count of each of target storages, and the comparison is performed in ascending order of the respective available stream counts of the source storages, and creating parallel cloning sessions based on the negotiated maximum stream count.

20 Claims, 8 Drawing Sheets

(56) References Cited

U.S. PATENT DOCUMENTS

| | | |
|---|---|---|
| 2011/0246763 A1 | 10/2011 | Karnes |
| 2011/0314120 A1* | 12/2011 | Gokhale ................. G06F 12/02 709/213 |
| 2012/0131583 A1* | 5/2012 | Cherkasova ........ G06F 11/1448 718/102 |
| 2013/0046946 A1 | 2/2013 | Ogasawara et al. |

OTHER PUBLICATIONS

U.S. Appl. No. 15/719,269, dated Nov. 2, 2018, Office Action.
U.S. Appl. No. 15/719,269, dated May 16, 2019, Final Office Action.
U.S. Appl. No. 15/719,269, filed Aug. 8, 2019, Office Action.
U.S. Appl. No. 15/719,269, filed Oct. 10, 2019, Notice of Allowance.

* cited by examiner ized in the appended drawings. Understanding that these drawings depict only example embodiments of the invention and are not therefore
SYSTEM AND METHOD FOR ANALYZING APPLICATION MAXIMUM PARALLEL CLONE SESSIONS FOR STORAGE DEVICES

RELATED APPLICATIONS

This application is a continuation of, and hereby claims priority to, U.S. patent application Ser. No. 15/719,269, entitled SYSTEM AND METHOD FOR ANALYZING APPLICATION MAXIMUM PARALLEL CLONE SESSIONS FOR STORAGE DEVICES, and filed Sep. 28, 2017. All of the aforementioned applications are incorporated herein in their respective entireties by this reference.

FIELD OF THE INVENTION

Example embodiments of the invention relate to systems and methods for managing data. More particularly, at least some embodiments of the invention relate to systems and methods for cloning savesets using parallel savestreams.

BACKGROUND

Entities typically generate and use data that is important in some way to their operations. This data can include, for example, business data, financial data, and personnel data. Accordingly, entities create and store backups of their important data that can later be used in a data restore process if necessary.

While the use of backups provides a measure of assurance and security, some entities prefer to take the additional step of replicating, or cloning, the backup so that if the backup should be unavailable for some reason, the clone can be accessed. The cloning concept has proven useful, but implementation of the cloning process itself has given rise to a variety of technological problems.

For example, cloning processes may employ parallel streams to copy multiple savesets to a storage target. In some instances, the number of parallel streams selected by the backup application defaults to 'unlimited' so that a user could, in theory, simply set the default value as 'unlimited' without having to determine how many streams are needed. While this approach would thus seem to be beneficial, some significant problems would result. For example, if the parallel replication session count is set to unlimited, the backup application will create as many sessions as possible to read from source storage and write to target storage. Rather than sessions being created however, an error message will typically be issued to the effect that the storage session replication limit will be exceeded and the sessions cannot be created.

Given the concerns with setting the number of streams as 'unlimited,' a typical approach is to allow the user to manually set the number of streams to be employed in a cloning process. However, manually setting the parallel replication count to a user-specified value requires that a user have determined, in advance, how many streams are supportable by the source storage. Making this determination, if it can be made at all, may be a complicated and time-consuming process that is not suited for performance by a human.

Another complicating factor concerns the fact that target storage capabilities, as well as source storage capabilities, are not well accounted for in conventional systems and methods. As a result, a variety of technological problems may occur. Such technological problems include, for example, overutilization of storage, and underutilization of storage. Moreover, these problems are aggravated in circumstances where multiple cloning processes are being performed that involve a common source storage and/or common target storage.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
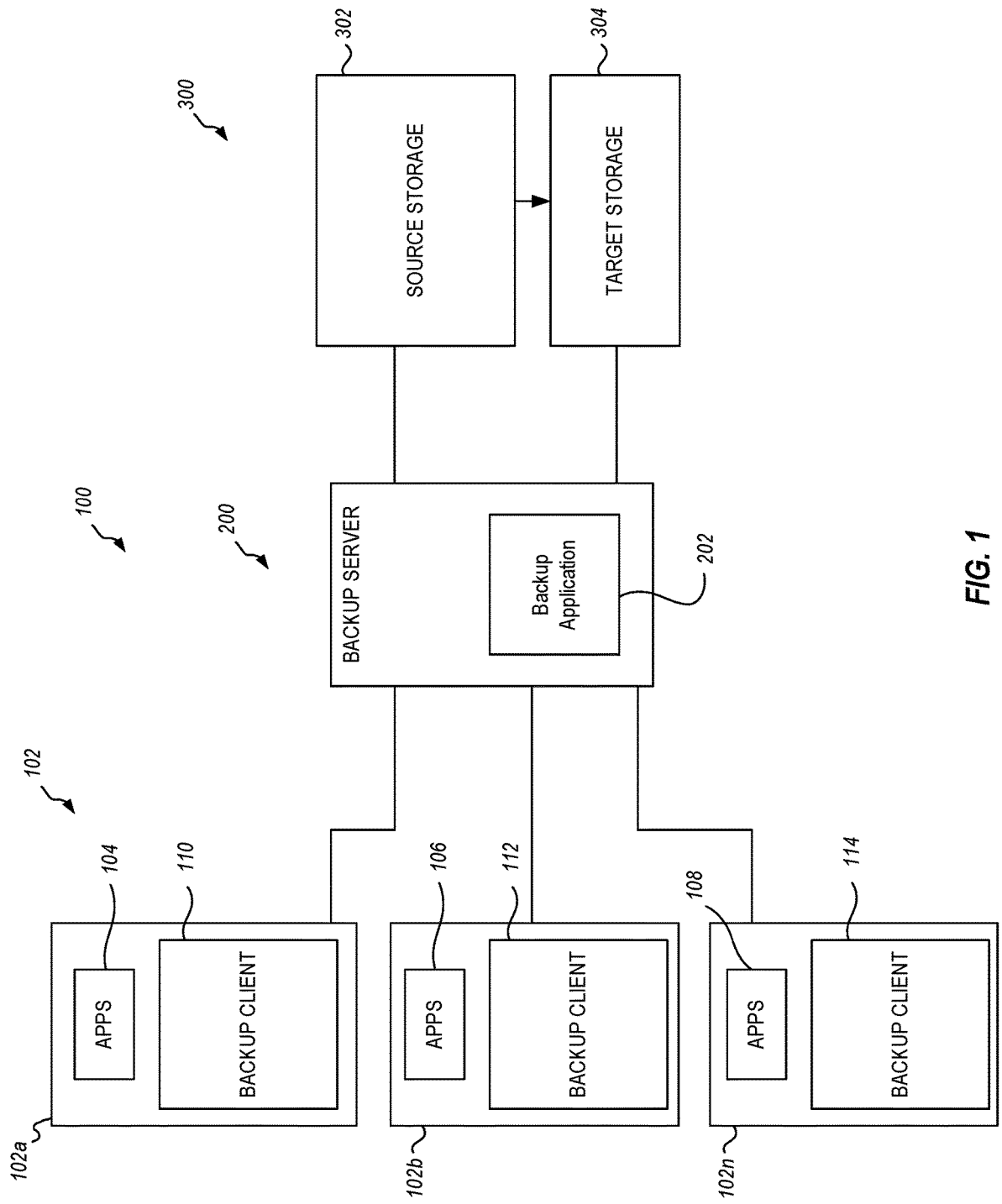
FIG. 1 discloses aspects of an example operating environment for some embodiments of the invention.

Example embodiments of the invention generally relate to systems and methods for managing data. More particularly, at least some embodiments of the invention concern systems, hardware, software, computer-readable media, and methods directed to cloning savesets using parallel savestreams.

Particularly, and in light of the technological problems noted herein, and others, what is needed are ways to assign parallel clone sessions to a clone group such that the clone session capabilities of the applicable source storage, as well as the clone session capabilities of the applicable target storage, are taken into account. These clone session capabilities may be described or referred to in terms of the number of parallel cloning streams that can be supported by the source storage and by the target storage. It would also be useful to optimize, or at least improve, the efficiency with which source storage and target storage capabilities are employed. That is, it would be useful to reduce, or eliminate, overutilization and underutilization of source storage clone session capabilities and target storage clone session capabilities, to the extent possible.

Thus, at least some embodiments of the invention may solve one or more of the technological problems noted herein by providing processes that use a storage application program interface (API) to get the maximum, and available, stream counts on both the source storage and the target storage. Based on that information, a negotiated number of streams is determined that may be used with the next set of clone sessions.

Thus, embodiments of the invention implement technological advances relative to conventional systems and methods inasmuch as they eliminate the use of an 'unlimited' default stream count. As well, embodiments of the invention likewise eliminate the need to manually determine stream counts.

In some example embodiments, each application residing on or hosted by a client or other entity may be associated with a maximum number of cloning streams. Each of the cloning streams, which may be initiated by a backup application on a backup server for example, may correspond to a respective saveset, where a saveset can include any type of data, and be of any size. In some example embodiments, a saveset comprises a file, or a plurality of files. The cloning processes disclosed herein may be performed after data has been backed up, that is, the backed up data may be cloned using the disclosed processes. Cloning processes can be performed on any basis, such as daily or weekly for example, and/or any time there is a change to backed up data. Moreover, cloning processes can be instantiated automatically such as, for example, in response to the occurrence or non-occurrence of an event, one example of which is the backing up of data.

A. Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in connection with a storage environment which may comprise, or consist of, a storage array. The storage environment can take various forms, including a cloud storage environment, an on-premises storage environment, or a hybrid storage environment that includes public and private elements, although the scope of the invention is not limited to any particular type of storage environment.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as filesystem, document, file, block, or object may be used by way of example, the principles of the disclosure are not limited to any particular form of representing, organizing, or storing, data or other information. Rather, such principles are equally applicable to any object capable of representing information.

With reference now to FIG. 1, details are provided concerning aspects of an operating environment for at least some embodiments of the invention, one example of which is denoted generally at 100. In general, various backup, restore and cloning operations, among others, can be performed in the operating environment 100. Such operations may include, for example, initiating a backup, generating backup streams, performing a backup, storing a backup, restoring a backup, cloning a backup, determining a maximum number of parallel cloning streams, and creating parallel cloning streams.

The operating environment 100 may include any number of clients 102, such as clients 102a, 102b . . . 102n, that each host one or more applications 104, 106 or 108. In general, the applications 104, 106 and 108 are not limited to any particular functionality or type of functionality, and in connection with their operation, the applications 104, 106 and 108 generate new and modified data that is desired to be backed up. Example applications include, but are not limited to, email applications, database applications, filesystems, CAD applications, audio applications, video applications, and datastores.

Each of the clients 102 additionally includes a backup client 110, 112 or 114 that cooperates with a backup application, discussed below, to create backups of data stored locally at the clients 102. As further indicated in FIG. 1, the operating environment 100 includes a backup server 200 that includes a backup application 202. The backup application 202 cooperates with the backup clients 110, 112 and 114 to create backups of data generated by the applications 104, 106 and 108, and stored at the clients 102a, 102b, and 102n. In some embodiments, the backup server 200 comprises a Dell-EMC Avamar server, or a Dell-EMC Networker server, although neither of those particular implementations is required for any embodiment.

When the backups have been created, the backup server 200 communicates with a storage array 300 to store the backups. In some example embodiments, the storage array 300 can comprise, or consist of, the Dell-EMC Data Domain environment, a global storage area network (GSAN), or storage area network (SAN). None of these particular implementations is required however.

In the illustrated example, the storage array 300, which can be, for example, a cloud datacenter, on-premises storage, or any other type of storage system or configuration or combination thereof, includes source storage 302 and target storage 304. The source storage 302 and the target storage 304 are isolated from each other so that failure of one does not affect the integrity of data stored at the other. The source storage 302 and the target storage 304 may be the same, or different, type of storage. In general, and as discussed in further detail herein, backups stored in the source storage 302 may be cloned to the target storage 304. In one example implementation of the storage array 300, one of the source storage 302 or target storage 304 may comprise the Dell-EMC Data Domain storage environment, while the other of the source storage 302 or target storage 304 may comprise a GSAN, although no particular configuration of the source storage 302 or target storage 304 is required.

B. Example Host Configuration

Figure 2:
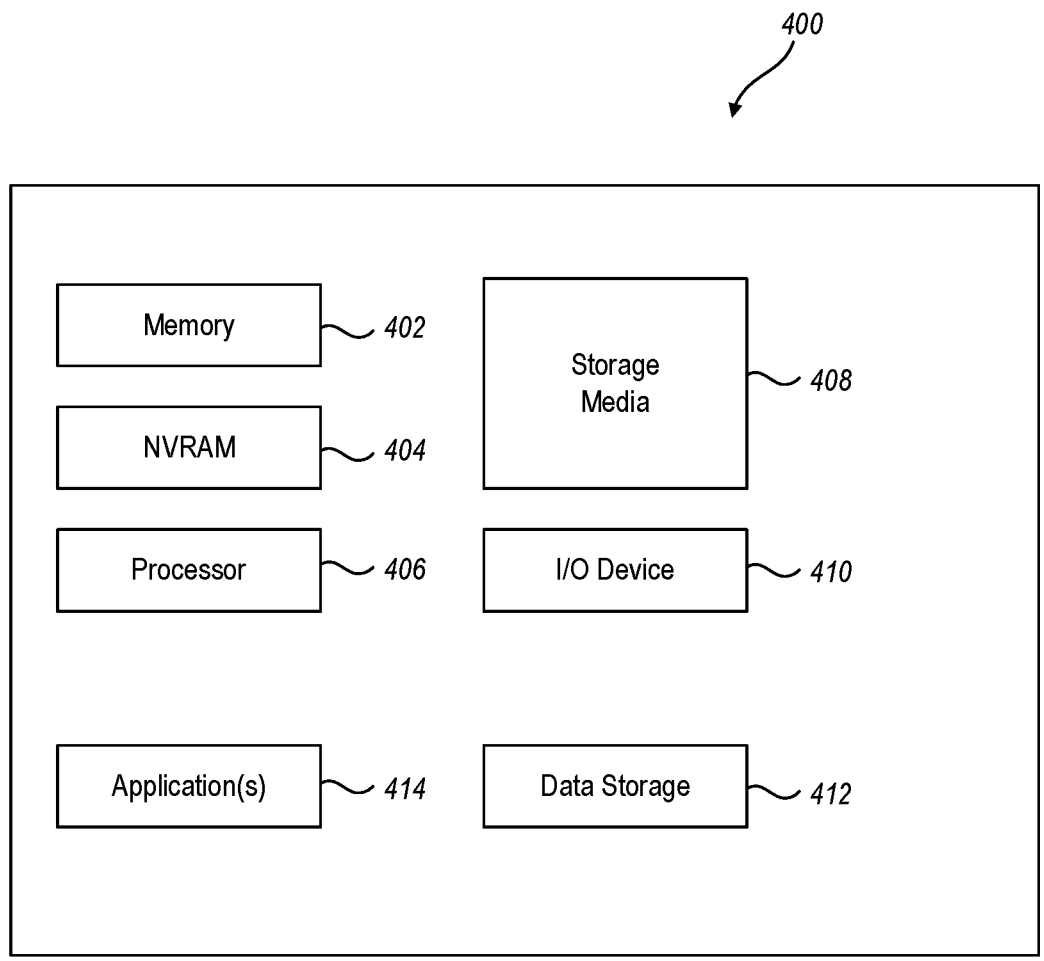
FIG. 2 discloses aspects of an example physical computing device configuration.

Turning briefly now to FIG. 2, any one or more of the clients 102, backup server 200, storage 302, and storage 304 can take the form of a physical computing device, one example of which is denoted at 400. In the example of FIG. 2, the physical computing device 400, which may be a host, includes a memory 402 which can include one, some, or all, of random access memory (RAM), non-volatile random access memory (NVRAM) 404, read-only memory (ROM), and persistent memory, one or more hardware processors 406, non-transitory storage media 408, I/O device 410, and data storage 412. One or more of the memory components of the physical computing device can take the form of solid state device (SSD) storage. As well, one or more applications 414 are provided that comprise executable instructions. Such executable instructions can take various forms including, for example, a backup client application, a backup application, a backup application that includes cloning functionality, a restore application, a backup and restore application, and a cloning application.

C. Example Problem Scenarios Addressed by Disclosed Embodiments

With reference now to FIGS. 3-7, some example hypothetical problem scenarios that may be addressed and resolved by example embodiments of the invention are disclosed. As used herein, cloning refers to the creation of one or more identical copies of a backup dataset. The backup dataset may be stored in storage that is designated source storage, while the clones may be stored in other storage that is designated target storage.

Figure 3:
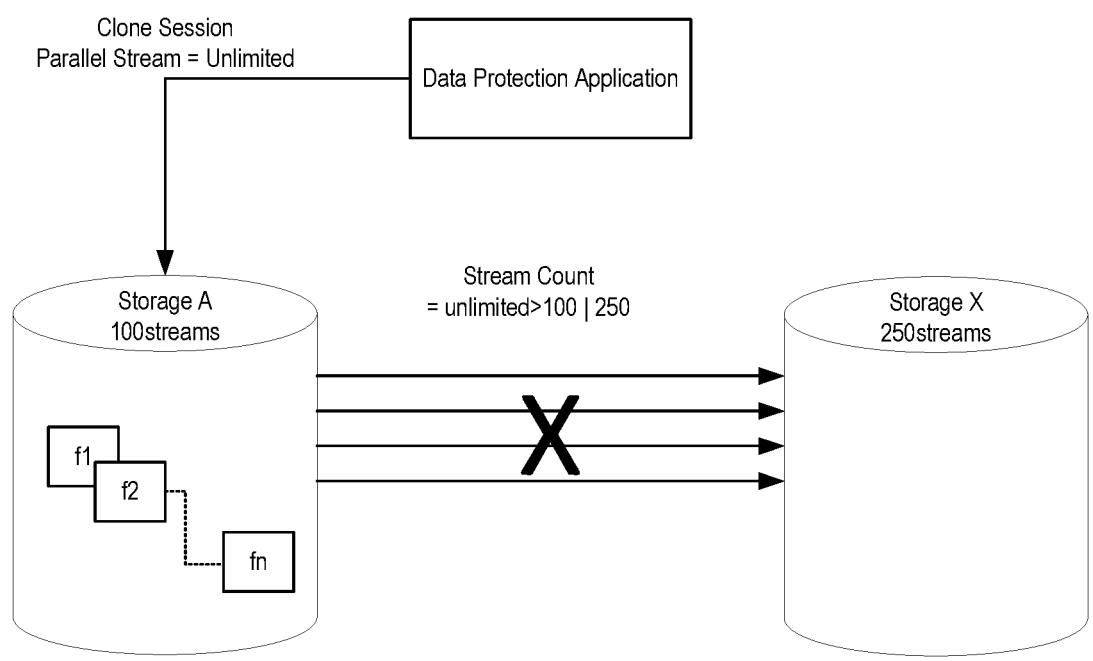
FIGS. 3-7 illustrate example technological problem scenarios that may be addressed and resolved by example embodiments of the invention.

Turning first to FIG. 3, a data protection application is disclosed that is configured to specify an 'unlimited' number of parallel clone sessions which involve making copies, or clones, of one or more backups f1 . . . fn stored at Storage A, the source storage, and streaming those clones to Storage X, the target storage. As indicated, Storage A is capable of supporting a maximum of 100 clone sessions, or streams, and Storage X is capable of supporting a maximum of 250 streams. When the parallel replication session count is set to 'unlimited,' the backup application will create as many sessions as possible to read from Storage A and write to Storage X. However, neither Storage A nor Storage X is able to support an unlimited number of streams and so a failure will occur because the session replication limit, as constrained by Storage A and Storage X, will be exceeded. For example, where a parallel clone session count is set to 'unlimited' in a Dell-EMC Data Domain storage environment, a message like the following may be generated "ddp_filecopy_start( ) failed, Err: 5005-nfs filecopy start failed with replication stream limit exceeded." Example embodiments of the invention may resolve this problem by providing for an automated process that determines a maximum possible number of clone sessions, without relying on or employing an 'unlimited' default value.

Figure 4:
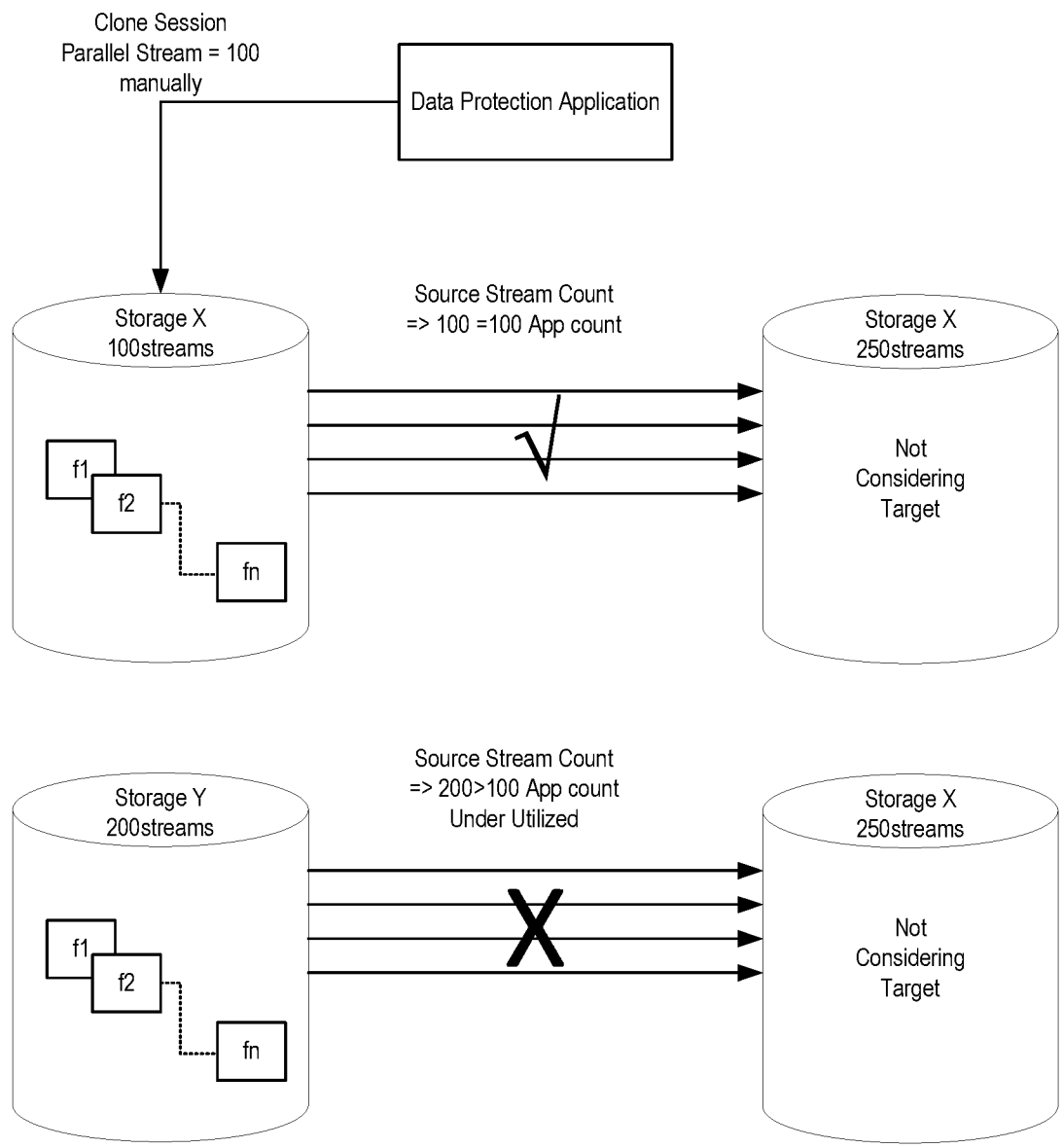

With reference next to FIG. 4, a configuration is disclosed in which a user manually specifies the number of streams that will be employed in a parallel clone session. Here, source Storage X includes backups f1 . . . fn and is capable of supporting 100 streams. Source Storage X is configured to communicate with a target Storage that is capable of supporting 250 streams. As well, source Storage Y, which is also configured to communicate with the same target Storage, includes backups f1 . . . fn, and is capable of supporting 200 streams. In this example, which is focused on source Storage capability rather than target Storage capability, the number of streams is manually set to 100, but this may result in underutilization of the replication capability of the disclosed arrangement. For example, the capability of source Storage Y is 200 streams, thus, the capacity of source Storage Y (200 streams) would be underutilized. As well, the capability of source Storage X is 100 streams, so the capacity of source Storage X would be overutilized. Thus, example embodiments of the invention may resolve this problem of over/under utilization by providing for a process that determines an optimal number of cloning sessions so as to best, or at least better, utilize available replication resources and capabilities.

Figure 5:
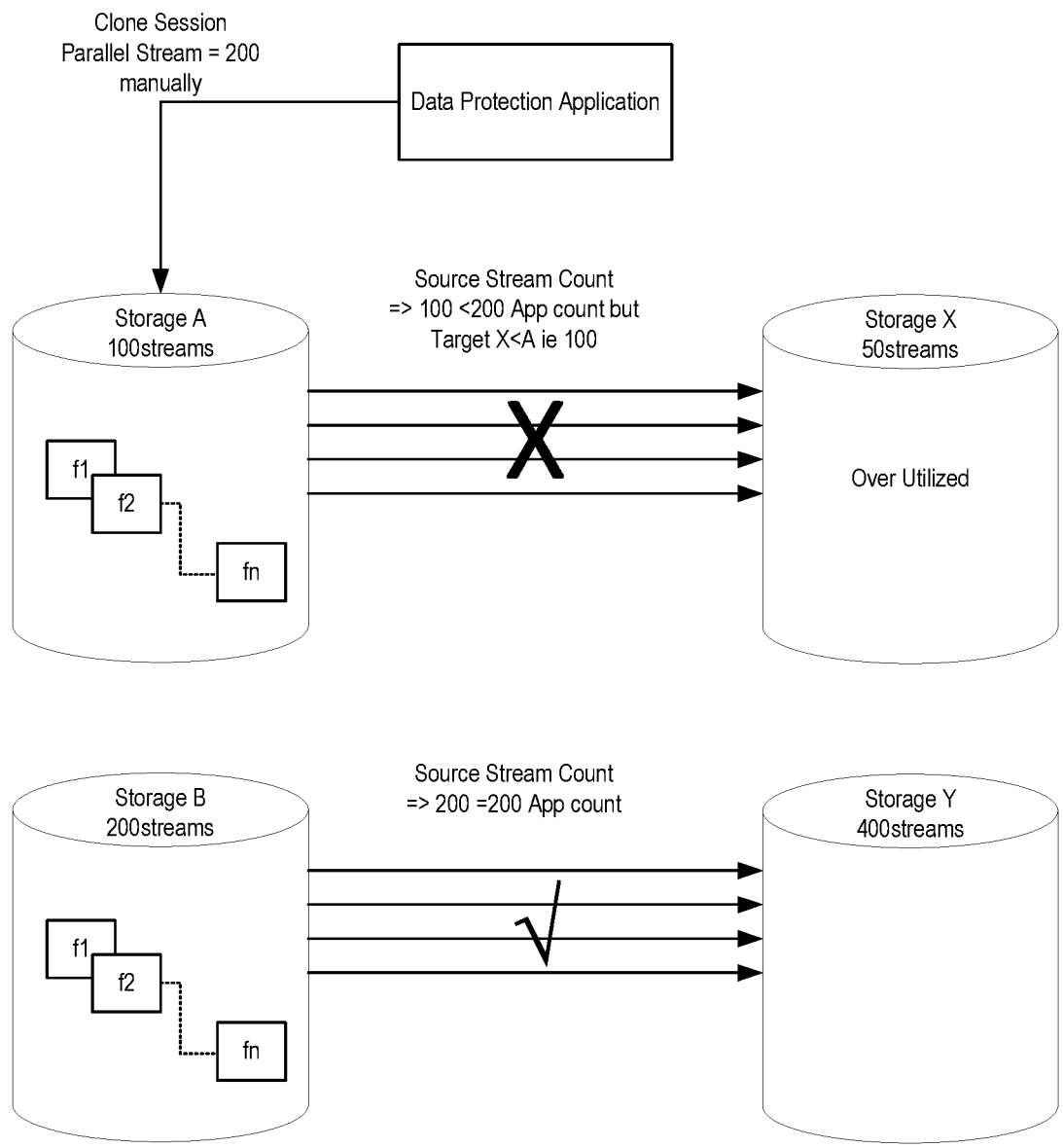

With reference next to FIG. 5, a configuration is disclosed in which a user manually specifies the number of streams that will be employed in a parallel clone session. In this example, the number of streams is manually set to 200. In this example, source Storage A includes backups f1 . . . fn and is capable of supporting 100 streams. Source Storage A is configured to communicate with a target Storage X that is capable of supporting 50 streams. As well, source Storage B includes backups f1 . . . fn and is capable of supporting 200 streams. Source Storage B is configured to communicate with a target Storage Y that is capable of supporting 400 streams. In this example, support is needed for 200 streams. However, neither source Storage A (100 stream capability) nor target Storage X (50 stream capability) can support 200 streams. That is, target Storage X would be overutilized in this example. On the other hand, both source Storage B (200 stream capability) and target Storage Y (400 stream capability) can support the manually specified 200 streams. Thus, some trial-and-error would be necessary on the part of the user in order to determine a combination, if any, of source Storage and target Storage that could support the manually specified number of streams. It is not adequate to simply check one of the source Storages and one of the target Storages.

Example embodiments of the invention may thus deal with this circumstance by implementing a replication stream count that is based upon the negotiated value between source storage and target storage. That is, when replication is desired to be performed, such embodiments may consider both the read stream capacity of the source and the write stream capacity of the target, in order to arrive at a maximum possible value as a replication stream count.

Figure 6:
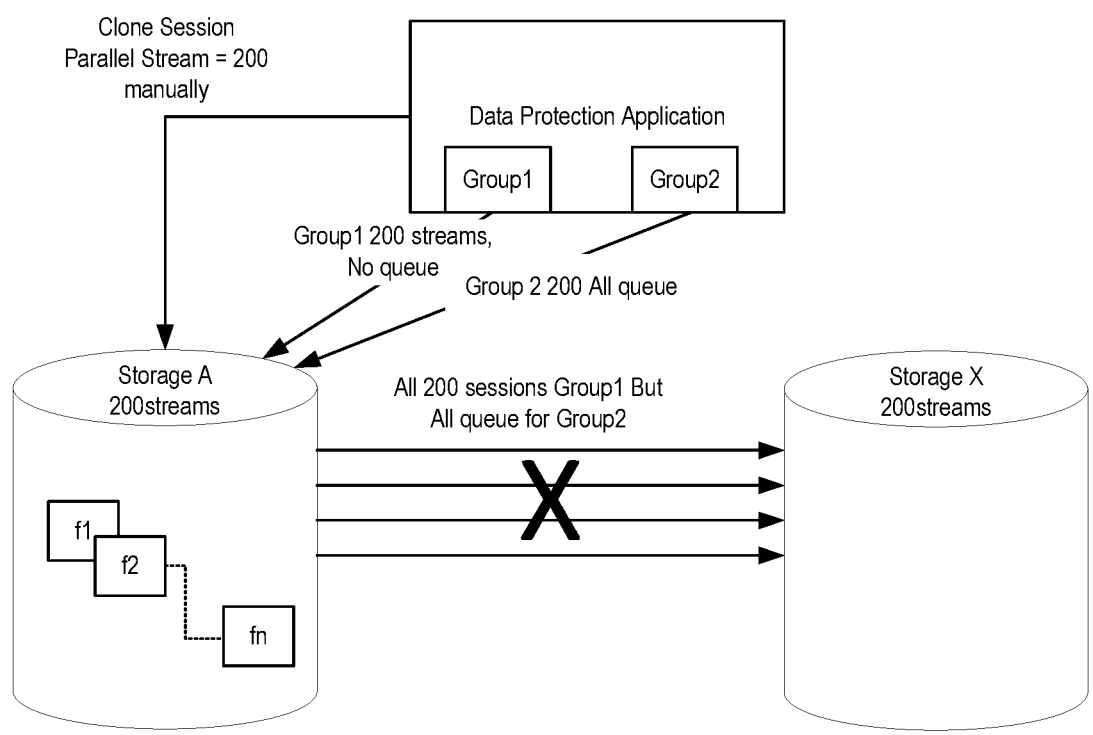

Turning now to the hypothetical of FIG. 6, this example indicates an arrangement that involves multiple replication processes running on the same combination of source and target storages. For example, Group1 may have 250 files or other savesets that are needed to be replicated from source Storage A to target Storage X, while Group2 may have 150 files or other savesets that are needed to be replicated from source Storage A to target Storage X. That is, both cloning processes involve the same source storage and the same target storage, and the number of files to be replicated for each Group may be specified by a cloning policy so that, in this example, multiple cloning policies must be taken into consideration. The number of cloning sessions in this example has been manually set at 200, and is supported by the source Storage A and target Storage X.

The problem presented in this example stems from the fact that multiple cloning processes are involved and are using the same source and target storage. As shown, all 200 streams may be apportioned to Group1, and no streams apportioned to Group2. That is, the Group2 savesets will be queued and only streamed after streaming of Group1 has been completed. However, 200 streams are not adequate to serve Group1 (250 savesets), and are more than is needed by Group2 (150 savesets). Thus, neither Group is well served by apportioning all 200 streams to Group1, and queuing Group2.

Example embodiments of the invention may thus provide for management of situations in which multiple replication processes are starting that involve various groups, each having a respective saveset. Particularly, example embodiments embrace processes that take variables such as these into consideration and use those as a basis for determining an optimum number of streams.

Figure 7:
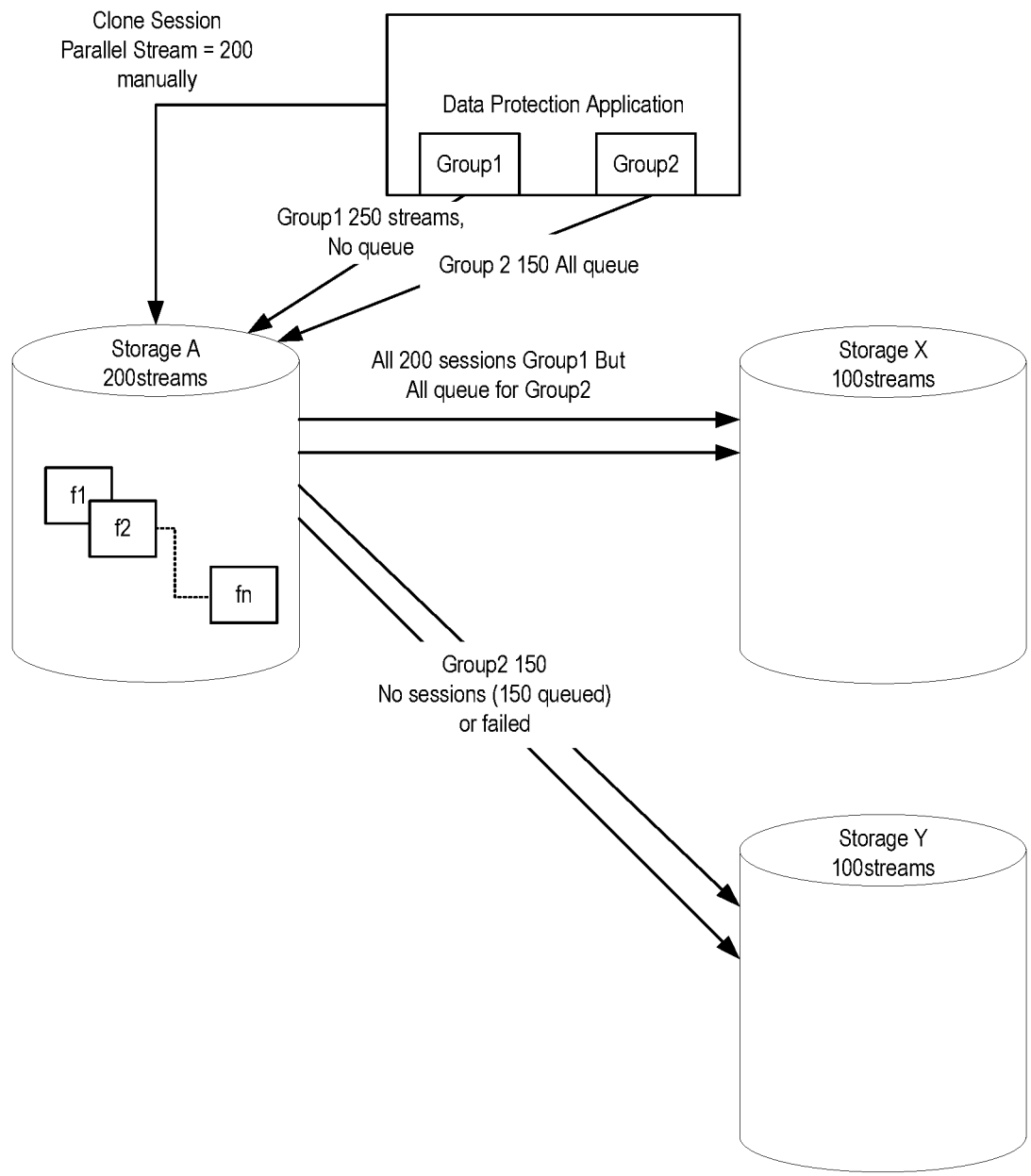

With reference next to FIG. 7, an example scenario is presented in which multiple groups are running with either source Storage or target Storage in common. For example, Group1 has 250 files for replication from source Storage A to target Storage X, and Group2 has 150 files for replication from source Storage A to target Storage Y. In this example then, Group1 and Group2 share source Storage A, but utilize different respective target Storage, that is, target Storage X for Group1 and target Storage Y for Group2. In an alternative example, Group1 has 250 files for replication from source Storage A to target Storage X, and Group2 has 150 files for replication from source Storage A to target Storage X. In this example then, Group1 and Group2 share target Storage X. In either of these examples, a failure may occur due to overutilization as the source Storage A, target Storage X, and/or target Storage Y might get over utilized. In particular, Group1 requires 250 streams, but source Storage A only supports 200 streams, and target Storage X and target Storage Y each only support only 100 streams which is not enough to support Group1 (250 streams) or Group2 (150 streams).

In the aforementioned examples of FIG. 7, either of source Storage A and target Storage X or Y are shared among multiple replication process. That is, either the source Storage or target Storage is implicated in multiple replication processes reading or writing, respectively.

Example embodiments of the invention may thus provide for management of situations in which multiple replication processes are employed that may share source Storage or target Storage with the result that, in some instances, the total capacity of the multiple target Storage devices is not fully utilized. Particularly, example embodiments embrace processes that take variables such as these into consideration and use those as a basis for determining an optimum number of streams.

D. Use Cases—Example Cloning Solutions

In general, at least some example embodiments, which can take the form of a data protection application such as a backup application, are concerned with assigning a number of parallel close sessions per clone group, where the number of clone sessions to be assigned is based on the available clone sessions, or session capability, of both the source Storage and the target Storage. Thus, instead of setting the value of the number of clone sessions as 'unlimited' by default, various embodiments employ a Storage application program interface (API) to get the maximum and available stream counts on both the source storage and the target storage and, based on a negotiated number, the backup application will then proceed with a set of clone sessions. As used here, the maximum sessions refers to the largest number of sessions potentially supportable by a source Storage or a Target storage, and the available sessions refers to the number of sessions actually supportable at a particular time by a source Storage or a Target storage. Below are some illustrative examples of the capabilities of various embodiments.

Example 1

Single Source Storage A and Single Target Storage X

In this example, a source Storage A has a maximum, and available, stream count of 200 (Var1), and a target Storage X has a maximum, and available, stream count of 100 (Var2). No other cloning sessions are taking place that involve those storages. As can be seen below, a determination of the number of cloning sessions to be opened by the backup application is determined with reference both to the target Storage and to the source Storage maximum and available stream counts.

| Var1 => Max stream count: source storage A = 200 | Var2 => Max stream count: target storage X = 100 |
| Var3 => Available stream count: source storage A = 200 | Var4 => Available stream count: target storage X = 100 |

Particularly, it can be seen that the maximum number of streams that can be supported by the combination of source storage A and target storage X may be determined by comparing Var1 and Var2. In this case, the maximum number of streams is 100, since although source Storage A can support 200 streams, the target Storage X cannot support more than 100 streams. Next, the available stream counts Var3 and Var4 are compared and it can be seen that while source Storage A has an available stream count of 200, the maximum number of streams supportable by target Storage X is 100. Finally, because Var4≤Var2 (maximum stream count for target Storage X), Var4 is the negotiated stream count, that is, 100 streams. Thus, the backup application may make best use, which may or may not be optimal use, of the maximum and available stream counts of the source storage A and target storage X by opening 100 cloning sessions.

Example 2

Single Source Storage A and Single Target Storage X

In this example, there is only a single source Storage A which has 100 streams as a maximum and only a single target Storage X which has a maximum stream count of 200. No other cloning sessions are taking place that involve those storages. As can be seen below, a determination of the number of cloning sessions to be opened by the backup application is determined with reference both to the target Storage and to the source Storage maximum and available stream counts.

| Var1 => Max stream count: source Storage A = 100 | Var2 => Max stream count: target Storage X = 200 |
| Var3 => Available stream count: source Storage A = 100 | Var4 => Available stream count: target Storage X = 200 |

Here, the maximum stream count of source Storage A is 100 streams, so the closest available stream count that will be consistent with source Storage A is selected. Particularly, it can be seen that by comparing Var3 with Var4 that Var3<Var4 and, as such, the Var3 stream count of 100 is the stream count which is selected as a result of the negotiation process. It can also be seen that, for the sake of comparison, if Var4<Var3, then Var4 would determine the stream count to be used since the number of sessions that could be created by the backup application could not be greater than the number of sessions supportable by the available stream count of the target Storage.

Example 3

Single Source Storage A and Dual Target Storage X and Y

In this example, there is only a single source Storage A which has 200 streams as a maximum, target Storage X has a maximum stream count of 200, and parallel target Storage Y has a maximum stream count of 150. No other cloning sessions are taking place that involve those storages. As can be seen below, a determination of the number of cloning sessions to be opened by the backup application is determined with reference both to the target Storage and to the source Storage maximum and available stream counts.

| | |
|---|---|
| Var1 => Max stream count: source Storage A = 200 | Var2 => max stream count: target Storage X = 200 & Storage Y = 150 |
| Var3 => Available stream count: source Storage A = 200 | Var4 => Available stream count: target Storage X = 200 |
| | Var5 => Available stream count: target Storage Y = 150 |

In this example, the number of target Storages is counted as 2, that is, target Storage X and target Storage Y. The various target Storages may be sorted based upon their respective available stream counts, so that counting from lowest to highest available stream counts, Var5 is first in order and Var4 is second in order. Next, compute Var3/2, where 2 is the total number of target Storages. That is, the available stream count from the source Storage A is 200, and may be split between the 2 targets, namely, between target Storage X and target Storage Y, in order to make best use of those target Storages. Thus, Var3/2=100. In this case then, 100<Var5 (150), so 100 sessions can be released for use with target Storage Y, and the remaining 100 sessions for use with target Storage X (Var4).

Example 4

Single Source Storage A and Dual Target Storage X and Y

In this example, there is only a single source Storage A which has 200 streams as a maximum, while the target Storage X has a maximum stream count of 50, and parallel target Storage Y has a maximum stream count of 450. No other cloning sessions are taking place that involve those storages.

| | |
|---|---|
| Var1 => Max stream count: storage A = 200 | Var2 => max stream count: storage X = 200 & Storage Y = 150 |
| Var3 => Available stream count: storage A = 200 | Var4 => Available stream count: storage X = 50 |
| | Var5 => Available stream count: storage Y = 450 |

In this example, the number of target Storages is counted as 2, that is, target Storage X and target Storage Y. The various target Storages may be sorted based upon their respective available stream counts, so that counting from lowest to highest available stream counts, Var4 is first in order and Var5 is second in order.

Next, compute Var3/2, where 2 is the total number of target Storages. That is, the available stream count from the source Storage A is 200, and may be split between the 2 targets, namely, between target Storage X and target Storage Y, in order to make best use of those target Storages. Thus, Var3/2=100, where 100>Var4 (50). Thus, 50 sessions can be released for target Storage X. Next, it is known that there are 150 remaining sessions available from source Storage A that must be accommodated, since 50 of the 200 available sessions have already been allocated to target Storage X. This can be seen by computing compute Var3/2+(50), which is 150. Now, compare Var3/2+(50) and Var5, that is, 150<450. Thus, target Storage Y can support the remaining 150 sessions, so the backup application can then release 150 sessions.

Example 5

Source Storage A/B and Target Storage X/Y

In this example, source Storages A and B have a maximum of 200 streams and 100 streams, respectively, while target Storage X has a maximum stream count of 50 and parallel target Storage Y has a maximum stream count of 450. No other cloning sessions are taking place that involve those storages.

| | |
|---|---|
| Var1 => Max stream count: storage A = 200; storage B = 100 | Var2 => max stream count: storage X = 200; Storage Y = 150 |
| Var3 => Available stream count: storage A = 200; | Var4 => Available stream count: storage X = 50 |
| Var6 => Available stream count: storage B = 100 | Var5 => Available stream count: storage Y = 450 |

In this example, there are 2 source Storages, source Storage A and source Storage B. The various source Storages may be sorted based upon their respective available stream counts, so that counting from lowest to highest available stream counts, Var6 is first in order and Var3 is second in order.

Next, the various target Storages, 2 total, may be sorted based upon their respective available stream counts, so that counting from lowest to highest available stream counts, Var4 is first in order and Var5 is second in order. Now, various comparisons may be performed. First, a comparison of Var6 and Var4 indicates 100>50. Thus, 50 sessions may be released by the backup application. Next, a comparison of Var6 (50 remaining available streams) and Var5 indicates 50<450, so that another 50 sessions may be released. At this point, all of the available streams for source Storage B have been allocated to one or the other of target Storage X and target Storage Y. However, source Storage A has 200 streams available, and target Storage Y has 400 remaining available streams. Thus, a comparison of Var3 and Var5 reveals that the Var3 streams (200) can be supported by the Var5 remaining available streams (400). Thus, 200 additional sessions can be released by the backup application.

As will be apparent from the foregoing examples, and the other disclosure herein, embodiments of the invention may provide various advantages. For example, in a customer environment with scaled setup and multiple devices, embodiments of the invention may provide for maximum and optimal utilization of available source storage and target storage resources. Among other things, such embodiments are thus able to resolve the problems that typically ensue when session counts are manually specified, or when session counts are defaulted to 'unlimited.'

E. Example Algorithm

An example algorithm consistent with at least some embodiments is set forth below. In general, the algorithm may include the following processes:

> Calculate available source Storages S(n);
> Sort available source Storages based on available sessions S(1), S(2) ...... S(n);
> Calculate available Target Storages T(m);
> Sort available Target Storages based on available sessions T(1), T(2) ...... T(m);
> Compare source against target Storages (with reference to available sessions);

and

> Utilize maximum sessions (source or target).

One specific implementation of an algorithm takes the following form:

```
While source device available as i
    While target device available as j
        Compare available sessions for S(i) against T (j)
            If S(i) < T(j)
                Source device utilized, decrease source device count i = i+1 and move to next compare cycle
            Else if S(i) = T(j)
                Source & Target device utilized, decrease source &target device count i= i+1, j = j+1 and move to next compare cycle
            Else if S(i) > T(j)
                Target device utilized, decrease target device count j = j+1 and move to next compare cycle
```

The compare loops are exited once either the source device count or the target device count becomes 0. That is, when either of these counts becomes 0, no additional sessions can be supported by the given combination of source storage devices and target storage devices. In this way, example embodiments make optimal use of system source and target storage resources, but do not overutilize those resources.

The following is an illustrative example of the use of the aforementioned algorithm, using a specific set of hypothetical stream counts.

```
Source devices: 3, s(1) = 100 , s(2) = 50 & s(3) = 150
Target devices: 4, t(1) = 50, t(2) = 100 , t(3)=140 & t(4) =80
1. Sorting
    s(2)->s(1)->s(3) = 50->100->150
    t(1)->t(4)->t(2)->t(3) = 50->80->100->140
2. Compare in loop
    a. s(2) vs t(1) => s(2) utilized & t(1) utilized ----50 sessions
    b. s(1) vs t(4) => 100 > 80 => t4 utilized ----80 sessions
    c. s(1) vs t(2) => 20 (100-80) < 100 => s(1) utilized ----20 sessions
    d. s(3) vs t(2) => 150 > 80 (100-20) => t(2) utilized ---- 80 sessions
    e. s(3) vs t(3) => 70 (150-80) < 140 => s(3) utilized ---- 70 sessions
    f. no source left end of comparison
```

F. Aspects of Some Example Methods

Figure 8:
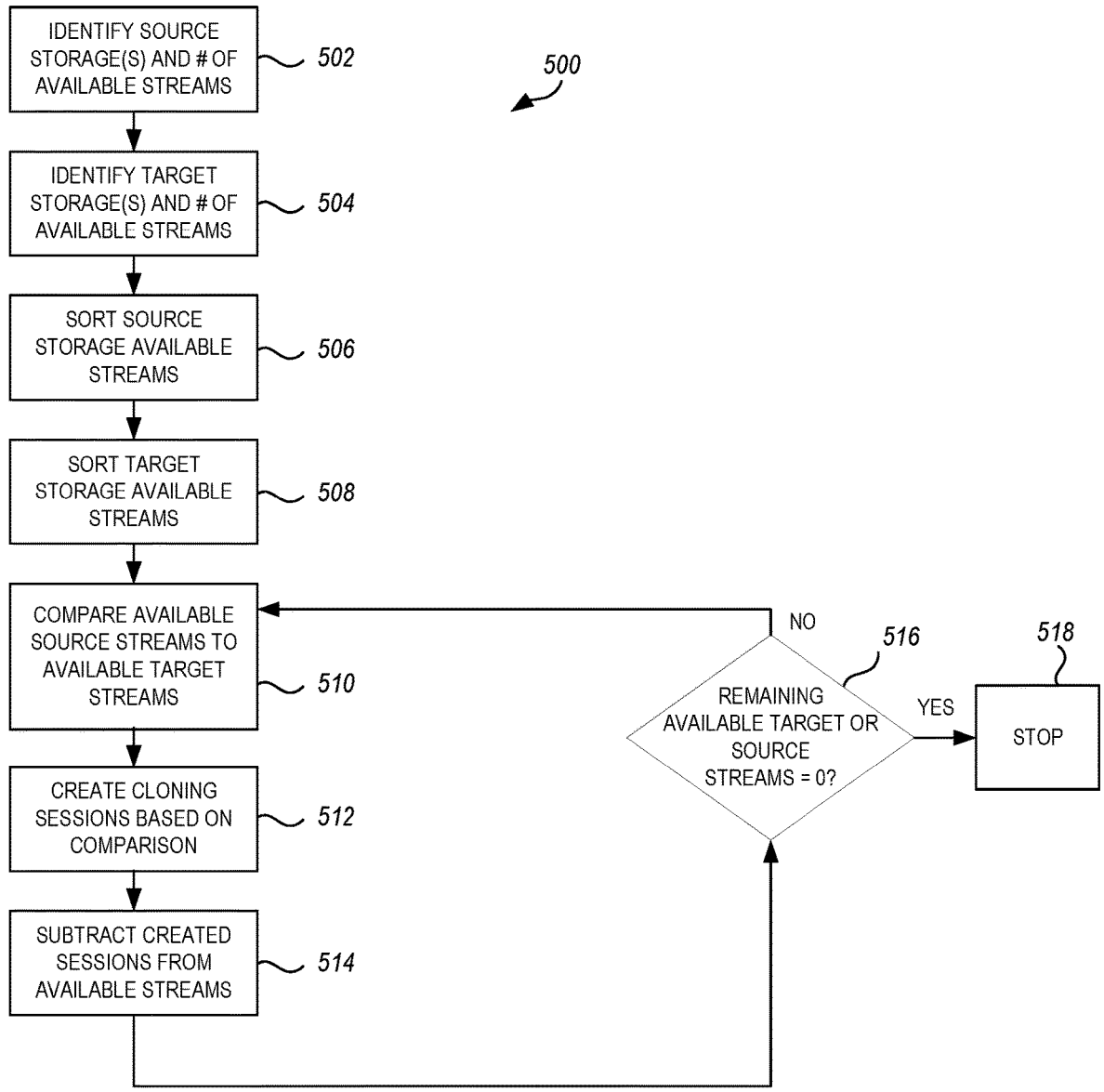
FIG. 8 is a flow diagram illustrating aspects of an example method for determining maximum parallel clone sessions for an application.

With attention now to FIG. 8, details are provided concerning some example methods for analyzing application maximum parallel clone sessions, one example of such a method is denoted generally at 500. The method 500 can be performed in an operating environment such as the example operating environment 100 in FIG. 1, although no particular operating environment is necessarily required. In some embodiments at least, part or all of the method 500 can be performed by a backup application that is able to communicate with one or more source storages and one or more target storages.

The example method 500 can begin by identification of one or more source storages and the number of available streams for each source storage 502. At 504, the number of target storages and their respective available streams are identified. Next, a sorting process is performed that involves sorting 506, on an individual source storage basis, the respective available streams of the source storages. In at least some embodiments, the available streams of the source storages are sorted 506 in ascending order. A similar process is performed for the target storage streams, namely, a sorting process is performed that involves sorting 508, on an individual target storage basis, the respective available streams of the target storages. In at least some embodiments, the available streams of the target storages are sorted 508 in ascending order.

It should be noted that while the processes 502 . . . 508 are set forth in a particular order in FIG. 8, other orders are possible. For example, process 504 could be performed before process 502. As another example, process 508 could be performed before process 506. In still other embodiments, processes 506 and 508 are collectively performed before either of processes 502 and 504. More generally, the scope of the invention is not limited to any particular order of these processes.

With continued reference to FIG. 8, a comparison of the available source storage streams and available target storage streams is performed 510, and parallel cloning sessions are then created 512 based on the results of the comparison. The number of sessions created are subtracted 514 from the available streams to generate a number of remaining available streams.

Next, a determination is made 516 as to whether or not there are any remaining available source storage streams or target storage streams. If either of the remaining available source storage streams or target storage streams=0, then the process 500 stops 518, since there is no support in the system, that is, there are not enough remaining available streams, for any additional cloning sessions. On the other hand, if neither of the remaining available source storage streams or target storage streams=0, then the process 500 returns to 510. Thus, the process 500 can be performed iteratively until either of the remaining available source storage streams or target storage streams=0. In this way, optimal use is made of the available streams in the system. While not specifically illustrated in FIG. 8, once the parallel cloning sessions are created 512, those cloning sessions can then be run and the savesets to which they correspond can be copied from source storage to target storage.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying one or more source storages and a respective available stream count for each source storage;
   identifying one or more target storages and a respective available stream count for each target storage;
   negotiating a maximum stream count for a combination of storages that includes the one or more source storages and the one or more target storages, in which the negotiation of the maximum stream count is based on: (i) the respective available stream counts for each source storage; and (ii) the respective available stream counts for each target storage, and the negotiation of the maximum stream count comprises comparing each source storage available stream count to a respective available stream count of each of the one or more target storages, and the comparison is performed in ascending order of the respective available stream counts of the one or more source storages;
   creating, with a backup application, parallel cloning sessions based on the negotiated maximum stream count, wherein the parallel cloning sessions are created without the use of a default, or a manual, specification of a session count, and the parallel cloning sessions are created in such a way as to make optimal use, by the parallel cloning sessions, of the source storages and target storages without overutilizing the source storages and target storages; and
   copying one or more savesets from the one or more source storages to the one or more target storages, wherein the copying is performed using the parallel cloning sessions.

2. The method as recited in claim 1, wherein one of the source storages and/or one of the target storages has a number of available streams that is less than a supportable maximum number of streams.

3. The method as recited in claim 1, wherein negotiation of the maximum stream count is based on either: a combination of storages that includes one source storage and multiple target storages; or a combination of storages that includes multiple source storages and multiple target storages.

4. The method as recited in claim 1, further comprising performing the following after the one or more source storages and the one or more target storages have been identified:
   sorting, for each source storage, the respective available streams of that source storage; and
   sorting for each target storage, the respective available streams of that target storage.

5. The method as recited in claim 1, wherein multiple target storages are identified, and only a single source storage is identified, and the available source storage streams are divided between the target storages based on the availability of target storage streams at each of the target storages.

6. The method as recited in claim 1, wherein the method is performed iteratively until one of the following is true: a number of available source storage streams is zero; or, a number of available target storage streams is zero.

7. The method as recited in claim 1, wherein the number of source storages is the same as the number of target storages.

8. The method as recited in claim 1, wherein the number of identified source storages is different from the number of identified target storages.

9. The method as recited in claim 1, wherein the number of identified source storages is less than the number of identified target storages.

10. The method as recited in claim 1, further comprising subtracting the number of created parallel cloning sessions from the smaller of remaining available source storage streams or remaining available target storage streams.

11. A non-transitory storage medium having stored therein instructions which are executable by one or more hardware processors to perform operations comprising:
   identifying one or more source storages and a respective available stream count for each source storage;
   identifying one or more target storages and a respective available stream count for each target storage;
   negotiating a maximum stream count for a combination of storages that includes the one or more source storages and the one or more target storages, in which the negotiation of the maximum stream count is based on: (i) the respective available stream counts for each source storage; and (ii) the respective available stream counts for each target storage, and the negotiation of the maximum stream count comprises comparing each source storage available stream count to a respective available stream count of each of the one or more target storages, and the comparison is performed in ascending order of the respective available stream counts of the one or more source storages;

creating, with a backup application, parallel cloning sessions based on the negotiated maximum stream count, wherein the parallel cloning sessions are created without the use of a default, or a manual, specification of a session count, and the parallel cloning sessions are created in such a way as to make optimal use, by the parallel cloning sessions, of the source storages and target storages without overutilizing the source storages and target storages; and copying one or more savesets from the one or more source storages to the one or more target storages, wherein the copying is performed using the parallel cloning sessions.

12. The non-transitory storage medium as recited in claim 11, wherein one of the source storages and/or one of the target storages has a number of available streams that is less than a supportable maximum number of streams.

13. The non-transitory storage medium as recited in claim 11, wherein negotiation of the maximum stream count is based on either: a combination of storages that includes one source storage and multiple target storages; or a combination of storages that includes multiple source storages and multiple target storages.

14. The non-transitory storage medium as recited in claim 11, wherein the operations further comprise performing the following after the one or more source storages and the one or more target storages have been identified:

sorting, for each source storage, the respective available streams of that source storage; and sorting for each target storage, the respective available streams of that target storage.

15. The non-transitory storage medium as recited in claim 11, wherein multiple target storages are identified, and only a single source storage is identified, and the available source storage streams are divided between the target storages based on the availability of target storage streams at each of the target storages.

16. The non-transitory storage medium as recited in claim 11, wherein the operations are performed iteratively until one of the following is true: a number of available source storage streams is zero; or, a number of available target storage streams is zero.

17. The non-transitory storage medium as recited in claim 11, wherein the number of source storages is the same as the number of target storages.

18. The non-transitory storage medium as recited in claim 11, wherein the number of identified source storages is different from the number of identified target storages.

19. The non-transitory storage medium as recited in claim 11, wherein the number of identified source storages is less than the number of identified target storages.

20. The non-transitory storage medium as recited in claim 11, wherein the operations further comprise subtracting the number of created parallel cloning sessions from the smaller of remaining available source storage streams or remaining available target storage streams.

* * * * *